(12) United States Patent
Ashary et al.

(10) Patent No.: US 11,081,704 B2
(45) Date of Patent: Aug. 3, 2021

(54) FUEL CELL SYSTEMS CONTAINING CHROMIUM FILTERS

(71) Applicant: BLOOM ENERGY CORPORATION, San Jose, CA (US)

(72) Inventors: Adil Ashary, San Jose, CA (US); Martin Perry, Mountain View, CA (US); David Weingaertner, Sunnyvale, CA (US); Richard Dole, San Jose, CA (US); Ivan Hartana, Sunnyvale, CA (US); Emad El Batawi, Mountain View, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 115 days.

(21) Appl. No.: 16/599,453

(22) Filed: Oct. 11, 2019

(65) Prior Publication Data
US 2020/0119370 A1 Apr. 16, 2020

Related U.S. Application Data

(60) Provisional application No. 62/745,047, filed on Oct. 12, 2018.

(51) Int. Cl.
*H01M 8/0217* (2016.01)
*H01M 8/04007* (2016.01)
*H01M 8/04014* (2016.01)
*H01M 8/0612* (2016.01)

(52) U.S. Cl.
CPC ..... *H01M 8/0219* (2013.01); *H01M 8/04022* (2013.01); *H01M 8/04074* (2013.01); *H01M 8/0612* (2013.01)

(58) Field of Classification Search
CPC .......... H01M 8/0219; H01M 8/04074; H01M 8/04022; H01M 8/0612; H01M 8/0662
See application file for complete search history.

(56) References Cited

U.S. PATENT DOCUMENTS

| 7,713,649 | B2 | 5/2010 | Hickey et al. |
| 8,563,180 | B2 | 10/2013 | Perry et al. |
| 8,968,943 | B2 | 3/2015 | Perry et al. |
| 9,806,345 | B2 * | 10/2017 | Qiu ..................... H01M 8/1231 |
| 10,340,543 | B2 | 7/2019 | Pillai et al. |
| 10,418,654 | B2 | 9/2019 | Trevisan et al. |
| 2016/0351912 | A1 * | 12/2016 | Qiu ..................... H01M 4/8663 |
| 2017/0069923 | A1 | 3/2017 | Trevisan et al. |
| 2018/0083300 | A1 | 3/2018 | Pillai et al. |

\* cited by examiner

*Primary Examiner* — Stewart A Fraser
(74) *Attorney, Agent, or Firm* — The Marbury Law Group PLLC

(57) ABSTRACT

A fuel cell system includes fuel cells disposed in a stack and separated by interconnects, a cathode recuperator configured to heat air provided to the stack using reaction exhaust provided from the stack, a steam generator configured to receive the reaction exhaust from the cathode recuperator and generate steam using the reaction exhaust, a hot box housing the stack, cathode recuperator, and steam generator, and a Cr filter including a porous metal and configured to remove Cr vapor species from the reaction exhaust.

20 Claims, 7 Drawing Sheets

FUEL CELL SYSTEMS CONTAINING CHROMIUM FILTERS

FIELD

Aspects of the present invention relate to fuel cell systems that include chromium filters.

BACKGROUND

Fuel cell systems, such as solid oxide fuel cell systems may be configured to operate at high temperatures and under harsh conditions. Accordingly, such systems may include components having a high chromium content, in order to withstand such operating conditions. However, fuel cell operating conditions may result in the generation of chromium vapor species, due to the oxidation of chromium components, which are considered hazardous if released into the environment.

SUMMARY

Exemplary embodiments of the present disclosure provide fuel cell system comprising: fuel cells disposed in a stack and separated by interconnects; a cathode recuperator configured to heat air provided to the stack using reaction exhaust provided from the stack; a steam generator configured to receive the reaction exhaust from the cathode recuperator and generate steam using the reaction exhaust; a hot box housing the stack, cathode recuperator, and steam generator; and a Cr filter including a porous metal and configured to remove Cr vapor species from the reaction exhaust.

In another embodiment, a method of operating a fuel cell system comprises operating a fuel cell stack to generate a reaction exhaust containing Cr vapor species; and providing the reaction exhaust through a Cr filter comprising a porous metal to remove at least 50% volume percent of the Cr vapor species from the reaction exhaust.

In one embodiment, the method also includes a cathode recuperator in which air provided to the stack is heated using the reaction exhaust provided from the stack; and a steam generator in which the reaction exhaust received from the cathode recuperator vaporizes water into steam. In one embodiment, the Cr filter is disposed in an exhaust conduit fluidly connecting a cathode recuperator to a steam generator. In another embodiment, the Cr filter is disposed in the steam generator. In yet another embodiment, the Cr filter is disposed in an exhaust conduit which receives the reaction exhaust output from the steam generator. In one embodiment, the metal is an aluminum or titanium mesh or foam.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1A:
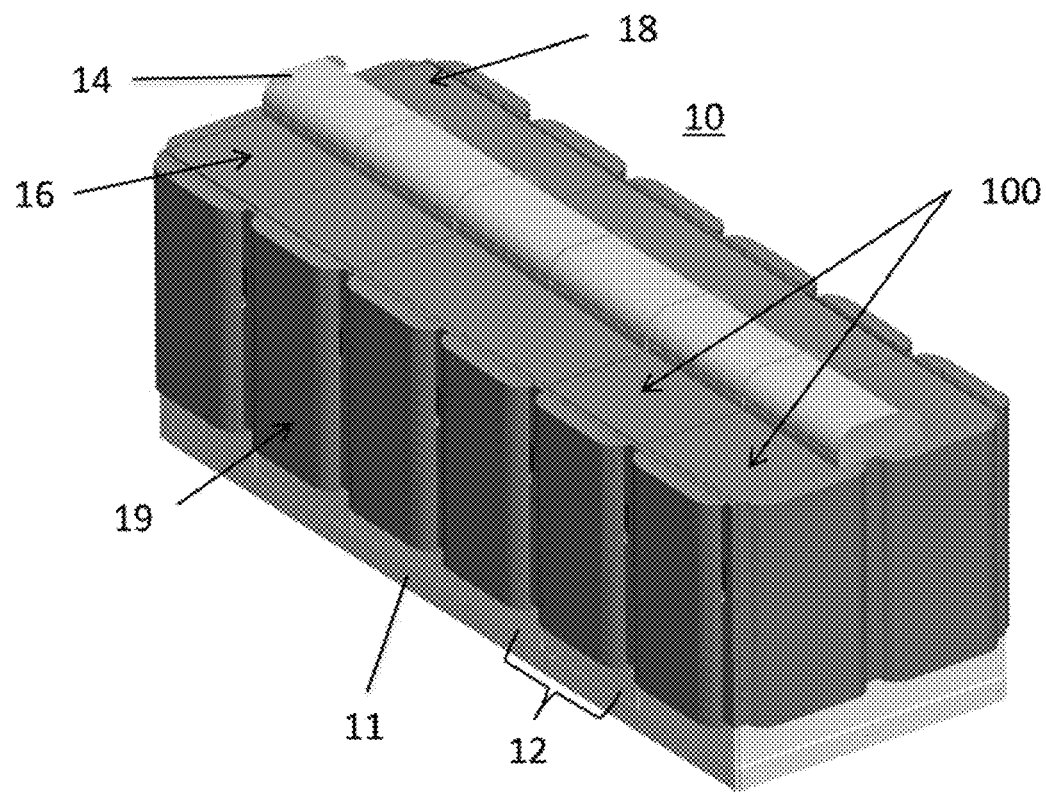
FIG. 1A is a perspective view of a modular fuel cell system, according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The term "fuel cell stack," as used herein, means a plurality of stacked fuel cells that can optionally share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

Fuel Cell Systems

Figure 1B:
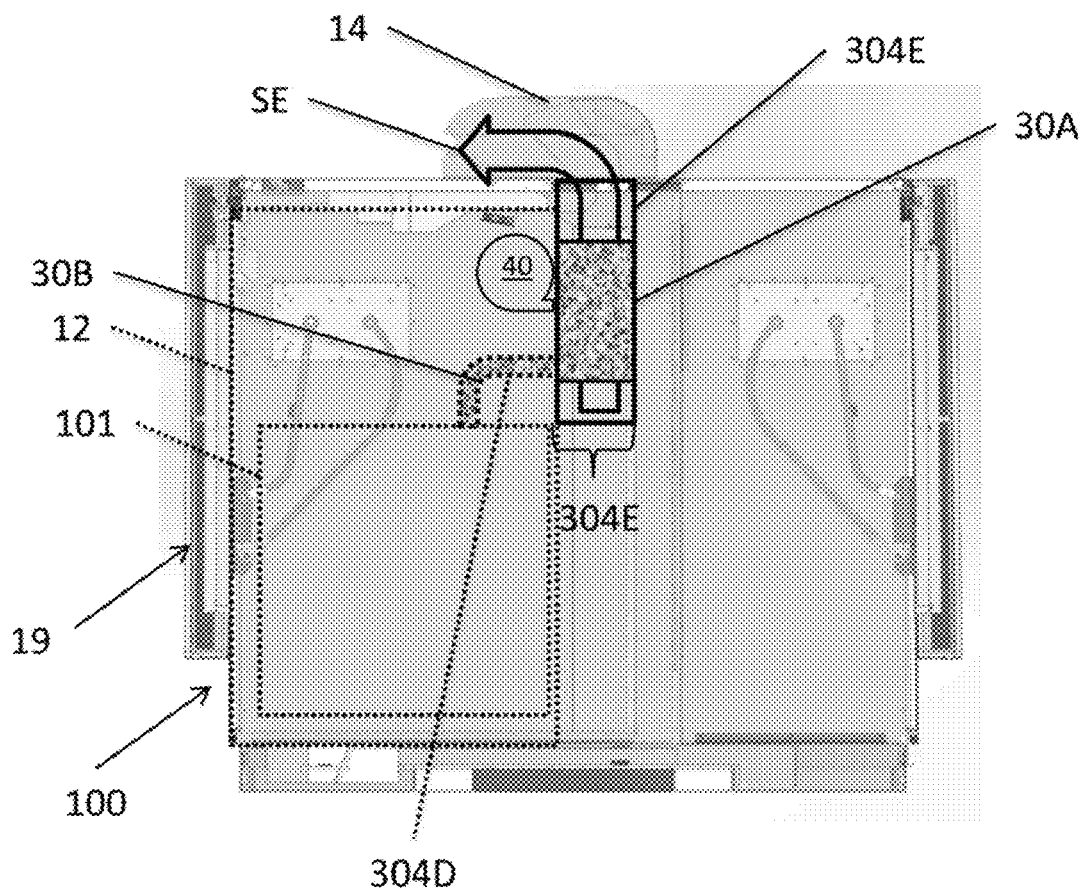
FIG. 1B is a side cross-sectional view of the system of FIG. 1A.

FIG. 1A is a perspective view of a modular fuel cell system 10, according to various embodiments of the present disclosure, and FIG. 1B is a sectional view of the system 10 of FIG. 1A. Referring to FIGS. 1A and 1B, the system 10 may include a base 11, housings comprising modular cabinets 12, and a roof cap assembly 14. The cabinets 12 may be disposed on the base 11 and may house various system modules, such as fuel cell modules 100, a fuel processing module 16, and a power conditioning module 18. Each cabinet 12 may contain a door 19. For example, the fuel cell modules 100 may contain components described in U.S. Pat. No. 8,968,943, issued on Mar. 3, 2015 and in U.S. Published Application US 2017/0069923 A1 published on Mar. 9, 2017, which are both incorporated herein by reference in their entirety.

The fuel cell modules 100 may each include a hotbox 101 and an exhaust conduit 304D. The system 10 may also include a system exhaust conduit 304E configured to guide system exhaust SE to the roof cap 14. The system exhaust SE may include relatively hot reaction exhaust received from the module exhaust conduit 304D and relatively cool cabinet exhaust received from the corresponding cabinet 12. The system 10 may include a cabinet fan or blower 40 to provide the cabinet exhaust to the system exhaust conduit 304E. The reaction exhaust may refer to reaction products formed when fuel cell stack fuel exhaust is reacted with fuel cell stack air exhaust in an anode tail gas oxidizer, and the cabinet exhaust may refer to ventilation air that that is blown through the housing 12 by the cabinet fan 40, without entering the hot box 101.

Figure 2:
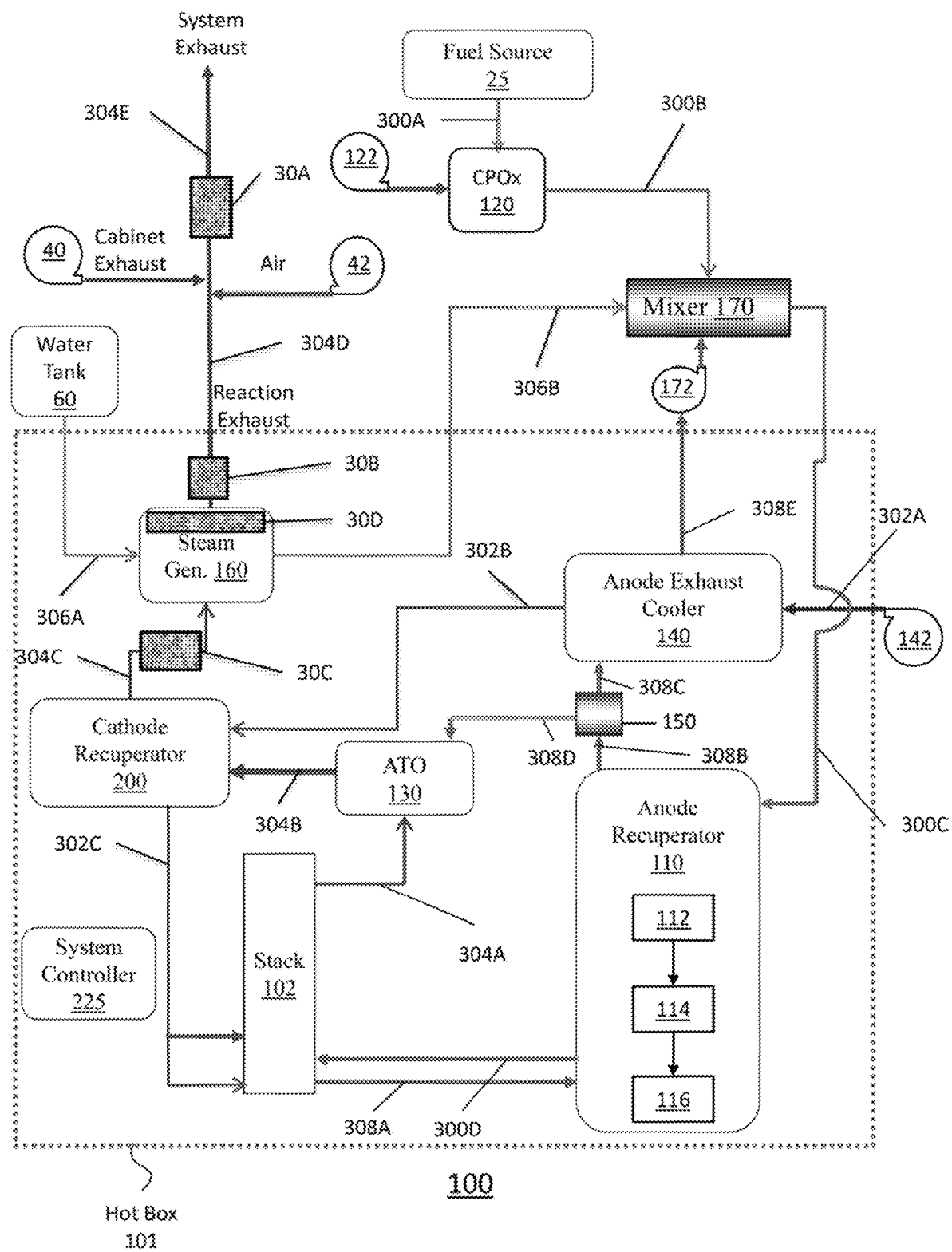
FIG. 2 is a component diagram of a fuel cell module included in the system of FIGS. 1A and 1B, according to various embodiments of the present disclosure.

FIG. 2 is a schematic view of the fuel cell system module 100 of FIGS. 1A and 1B, according to various embodiments of the present disclosure. Referring to FIG. 2, the module 100 may include a hotbox 101 and various components disposed therein or adjacent thereto. The hot box 101 may contain one or more fuel cell stacks 102. The stacks 102 may include solid oxide fuel cells that are separated from one another by conductive interconnect plates. The fuel cells may contain a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM). The stacks 102 may be arranged in columns that include fuel manifolds disposed between adjacent stacks 102.

The fuel cell stacks 102 may be externally and/or internally manifolded. For example, the stacks 102 may be internally manifolded for fuel and air, with fuel and air risers extending through openings in the fuel cell layers and/or in the interconnect plates between the fuel cells. Alternatively, the fuel cell stacks 102 may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The hot box 101 may also contain an anode recuperator heat exchanger 110, a cathode recuperator 200 (e.g., cathode heat exchanger), an anode tail gas oxidizer (ATO) 130, an anode exhaust cooler 140, a splitter 150, and a steam generator 160. The module 100 may also include a catalytic partial oxidation (CPOx) reactor 120, a mixer 170, a CPOx blower 122, a main air blower 142, and an anode recycle blower 172, which may be disposed outside of the hot box 101. However, the present disclosure is not limited to any particular location for each of the components with respect to the hot box 101.

The CPOx reactor 120 receives a fuel inlet stream from a fuel source 25, such as a fuel tank or gas line, through fuel conduit 300A. The fuel source 25 may provide a hydrocarbon fuel selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syngas, bio-gas, bio-diesel and other suitable hydrocarbon or hydrogen containing fuels.

The CPOx blower 122 may provide air to the CPOx reactor 120. During a cold startup the fuel is partially oxidized in the CPOx reactor 120 by injection of air from the CPOx blower 122. The CPOx reactor 120 may include a glow plug to initiate this catalytic reaction. During this cold-start operational mode the CPOx reactor 120 may be operated at a temperature ranging from about 600° C. to about 800° C., such as from about 650° C. to about 750° C., or about 700° C. The CPOx blower 122 generally operates during startup, and is usually not operated during steady-state operation.

The main air blower 142 may be configured to provide an air stream to the anode exhaust cooler 140 through air conduit 302A. Air flows from the anode exhaust cooler 140 to the cathode recuperator 200 through air conduit 302B. The air flows from the cathode recuperator 200 to the stack 102 through air conduit 302C.

Anode exhaust generated in the stack 102 is provided to the anode recuperator 110 through anode exhaust conduit 308A. The anode exhaust may contain unreacted fuel. As such, the anode exhaust may also be referred to herein as fuel exhaust. The anode exhaust is provided from the anode recuperator 110 to a splitter 150 by anode exhaust conduit 308B. Anode exhaust may be provided from the splitter 150 to the anode exhaust cooler 140 by anode exhaust conduit 308C. Anode exhaust may be provided from the splitter 150 to the ATO 130 by anode exhaust conduit 308D. Anode exhaust may be provided from the anode exhaust cooler 140 to mixer 170 by anode exhaust conduit 308E. Accordingly, the splitter 150 may control an amount of anode exhaust is recycled to the mixer (i.e., may control an anode exhaust recycling percentage). The anode recycle blower 172 may be configured to move anode exhaust though anode exhaust conduit 308E.

Cathode exhaust generated in the stack 102 flows to the ATO 130 through exhaust conduit 304A. Cathode exhaust and/or ATO exhaust generated in the ATO 130 flows from the ATO 130 to the cathode recuperator 200 through exhaust conduit 304B. ATO exhaust flows from the cathode recuperator 200 to the steam generator 160 through exhaust conduit 304C. Exhaust flows from the steam generator 160 and out of the hot box 101 through exhaust conduit 304D.

Water flows from a water source 60, such as a water tank or a water pipe, to the steam generator 160 through water conduit 306A. The steam generator 160 converts the water into steam using the exhaust provided by exhaust conduit 304C. Steam is provided from the steam generator 160 to the mixer 170 through water conduit 306B. Alternatively, if desired, the steam may be provided directly into the fuel inlet stream and/or the anode exhaust may be provided directly into the fuel inlet stream followed by humidification of the combined fuel streams. The mixer 170 is configured to mix the steam with anode exhaust and fuel. This fuel mixture may then be heated in the anode recuperator 110, before being provided to the stack 102.

The anode recuperator 110 may include various catalysts. For example, the anode recuperator 110 may include an oxidation catalyst configured to remove oxygen from the fuel, a hydrogenation catalyst configured to combine unsaturated hydrocarbons, such as ethylene and propylene (alkenes), with available hydrogen in the fuel, resulting in saturated hydrocarbons, and a reforming catalyst configured to partially reform the fuel before the fuel is delivered to the stack 102.

The module 100 may further include a controller 225 configured to control various elements of the module 100. The controller 225 may include a central processing unit configured to execute stored instructions. For example, the controller 225 may be configured to control fuel and/or air flow through the module 100.

The module 100 may also include one or more Cr filters 30, (e.g., Cr filters 30A, 30B, 30C and/or 30D) to reduce Cr vapor emissions, as discussed in detail below.

Chromium Emissions Control

SOFC systems, such as fuel cell system 10, may operate at high temperatures. For example, operating temperatures inside the hot box 101 of module 100 may reach 800° C., or more. Many components in the module 100 may be made from structural alloys that contain a substantial amount of chromium, such as and INCONEL 625 and 800 nickel-chromium alloys which contain approximately 20 wt % chromium. Upon high temperature exposure, a protective $Cr_2O_3$ scale develops on the alloy surface, such as on the surface of fuel cell interconnects. This $Cr_2O_3$ scale may be further oxidized to form several chromium vapor species, by reaction with oxygen in the inlet air and moisture generated from the oxidation of hydrogen in the fuel.

For example, vaporization reactions for the formation of gaseous chromium oxide, hydroxide and oxyhydroxide species have been proposed as follows:

$$\tfrac{1}{2}Cr_2O_3\ (s) + v\tfrac{1}{2}O_2\ (g) = CrO_i\ (g)\ (i=0,1,2,3)$$

$$\tfrac{1}{2}Cr_2O_3\ (s) + v\tfrac{1}{2}O_2\ (g) + vH_2O\ (g) = Cr(OH)_n\ (g)$$
$(n=1,2,3,\ldots 6)$ $$\tfrac{1}{2}Cr_2O_3\ (s) + v\tfrac{1}{2}O_2\ (g) + vH_2O\ (g) = CrO(OH)_j\ (g)$$
$(j=1,2,3\ldots 6);$ and $$\tfrac{1}{2}Cr_2O_3\ (s) + v\tfrac{1}{2}O_2\ (g) + vH_2O\ (g) = CrO_2(OH)_k\ (g)$$
$(k=1,2)$ Due to environmental concerns, emission of Cr vapor species, such as hexavalent Cr vapor species, from fuel cell systems should be minimized. As such, there is a need for fuel cell systems that are configured to limit Cr emissions.

According to various embodiments of the present disclosure, Cr filters configured to capture Cr vapor species generated in fuel cell system are provided. The Cr filters may be configured condense Cr vapor species, such as hexavalent Cr vapor species, such as $CrO_3$ (g) and/or $CrO_2(OH)_2$ (g), back to $Cr_2O_3$ (s). The Cr filter may remove at least 50% volume percent, including 50 to 100 vol. %, such as at least 70 vol. %, including 70 to 99 vol. %, such as 80 to 95 vol. % of the Cr vapor species, such as hexavalent Cr vapor species, from the reaction exhaust For example, the Cr filters may include a porous metal configured to condense and/or trap Cr vapor species. The porous metal may be in the form of an expanded mesh or foam, in order to provide a high surface area to increase vapor phase interaction during the condensation of Cr vapor species. In addition, the Cr filters may have multilayered and/or pleated designs to increase Cr vapor phase interaction and minimize pressure drop there through. The metal may be a reducing metal. Examples of suitable metals include aluminum and titanium. For ease of explanation, Cr filters including an aluminum mesh are discussed below. However, any suitable porous metal foam or mesh that functions as a chromium filter is encompassed by the present disclosure.

Figure 3A:
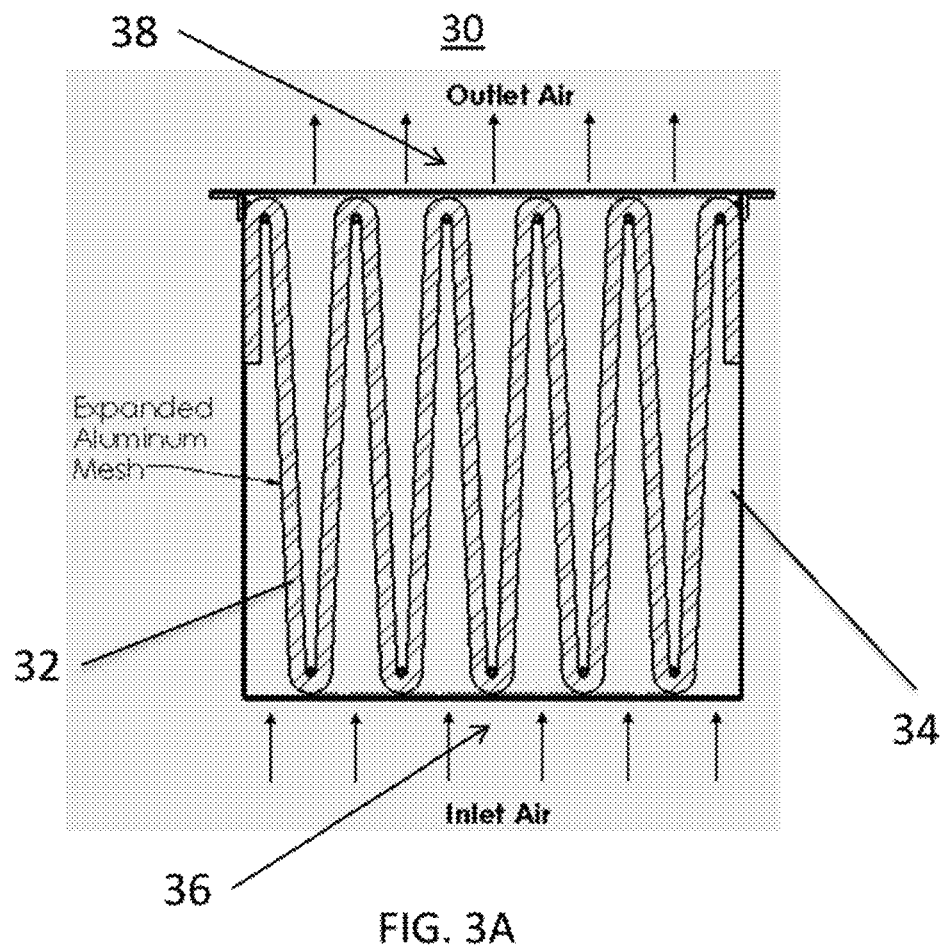
FIG. 3A is a schematic view of a pleated Cr filter 30.
Figure 3B:
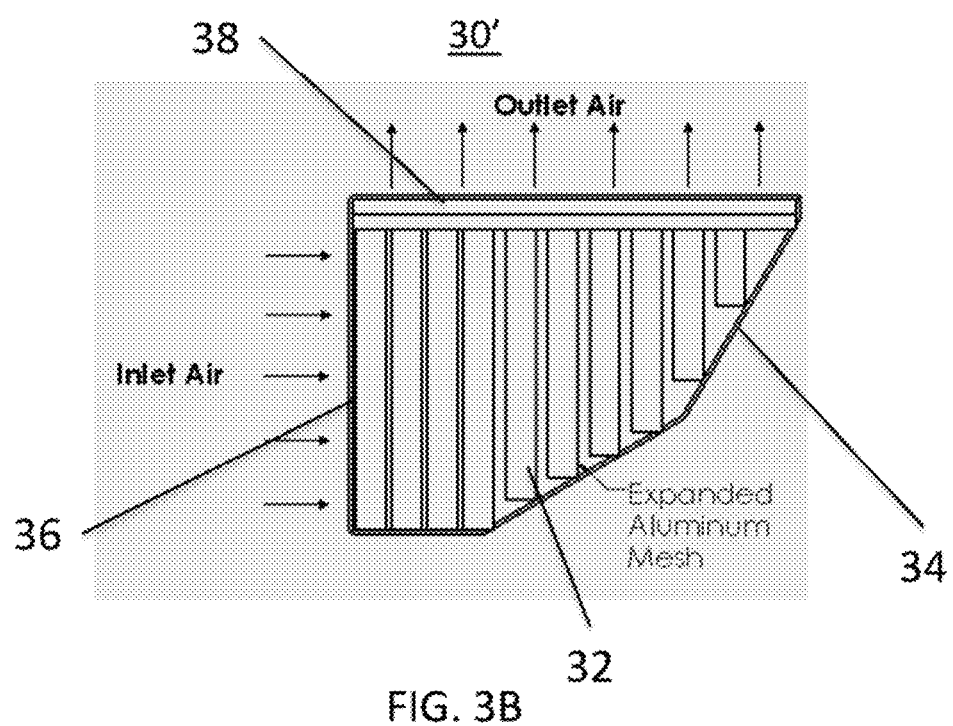
FIG. 3B is a schematic view of a multilayered Cr filter 30'.
Figure 3C:
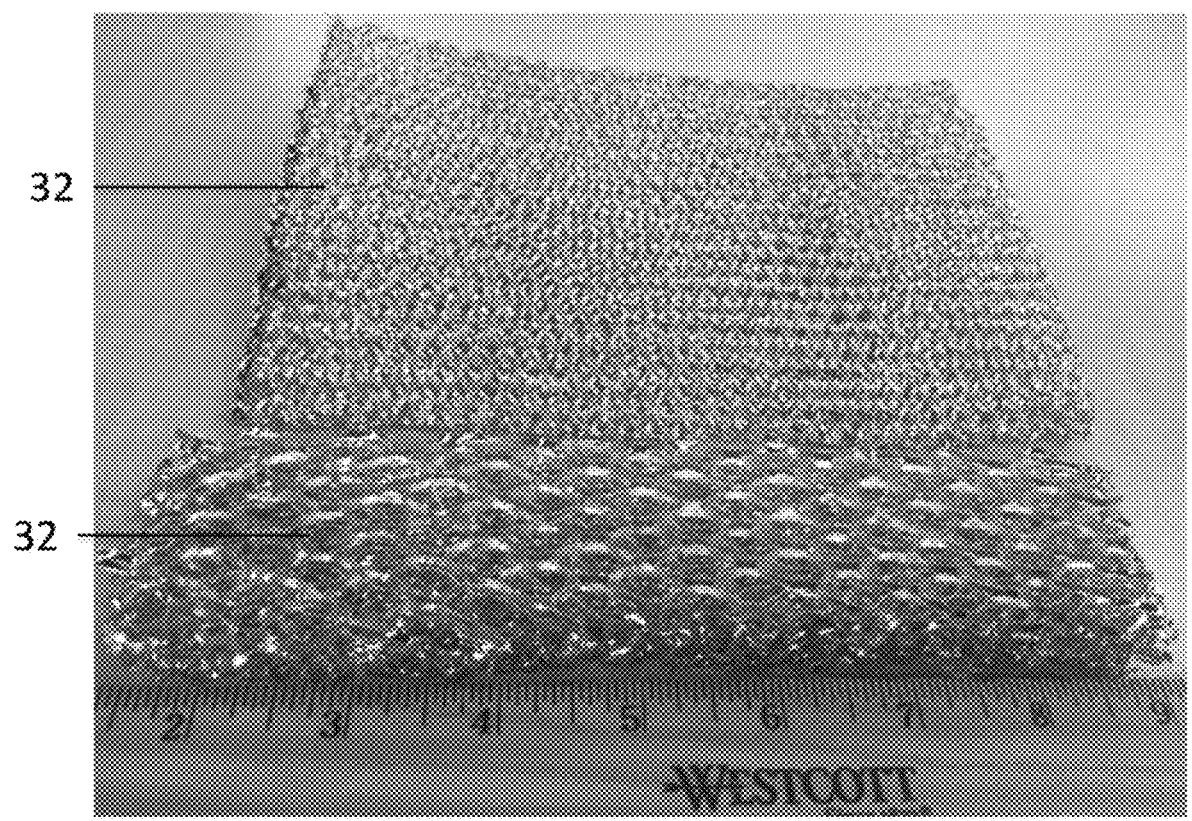
FIG. 3C is a photograph of an expanded aluminum mesh that may be included in a Cr filter, according to various embodiments of the present disclosure.

FIG. 3A is a schematic view of a pleated Cr filter 30, according to various embodiments of the present disclosure, FIG. 3B is a schematic view of a multilayered Cr filter 30', and FIG. 3C is a photograph of an expanded aluminum mesh that may be included in a Cr filter. Referring to FIG. 3A, the pleated Cr filter 30 may include a pleated porous metal mesh 32. The filter 30 may include a housing 34 having an inlet 36 and an opposing outlet 38, such that stack reaction exhaust flows through the filter 30 in one direction, while passing through the mesh 32. In some embodiments, the housing 34 may have a rectangular cross-section.

Referring to FIG. 3B, the multilayered Cr filter 30' may include separate layers of an expanded aluminum mesh 32. The filter 30' may include a housing 34 having an inlet 36 and an outlet 38 disposed on adjacent sides of the filter 30'. Accordingly, stack reaction exhaust entering and exiting the filter 30' may flow in substantially orthogonal directions. In some embodiments, the housing 34 may have a triangular cross-section.

Referring to FIGS. 3A-3C, the mesh 32 may have a thickness ranging from about ⅛" to about 1", such as from about ⅙" to about ⅔", or from about ¼" to about ⅝". The mesh 32 may have an expanded configuration, to increase stack reaction exhaust flow. In some embodiments, the mesh 32 may be used as a Cr filter without an additional housing. For example, the mesh may be inserted into and supported by a conduit or component of a fuel cell module or system, as discussed in detail below.

Referring again to FIGS. 1B and 2, in various embodiments, a Cr filter 30A may be disposed in the system exhaust conduit 304E. The filter 30A may be configured to filter Cr vapor species from the system exhaust SE. In particular, the filter 30A may be configured to condense Cr vapor species received from the reaction exhaust provided by exhaust conduit 304D. Thus, in this embodiment, the module 100 includes cabinet 12 housing (i.e., enclosing) the hot box 101, and the Cr filter 30A is disposed in the cabinet 12 entirely outside the hot box 101.

The reaction of Cr vapor species with the filter 30A may have an optimal temperature range. In order to maintain the filter 30A at such a temperature range, the cabinet fan 40 may be controlled to provide an appropriate flow rate of the relatively cool cabinet exhaust. Alternatively, it may be advantageous to only mix a portion of the cabinet exhaust with the reaction exhaust to maintain an appropriate reaction temperature. In other embodiments, the system 10 may include a separate fan or blower 42 to provide the ambient air to mix with the reaction exhaust.

According to other embodiments, a Cr filter 30B may be disposed in exhaust conduit 304D entirely inside the hot box 101, entirely outside the hot box 101 or partially inside and partially outside the hot box 101. In particular, the filter 30B may be disposed in exhaust conduit 304D, downstream of the steam generator 160. In other embodiments, a Cr filter 30C may be disposed upstream of the steam generator 160, e.g., between the steam generator 160 and the cathode recuperator 200, in exhaust conduit 304C.

Figure 4A:
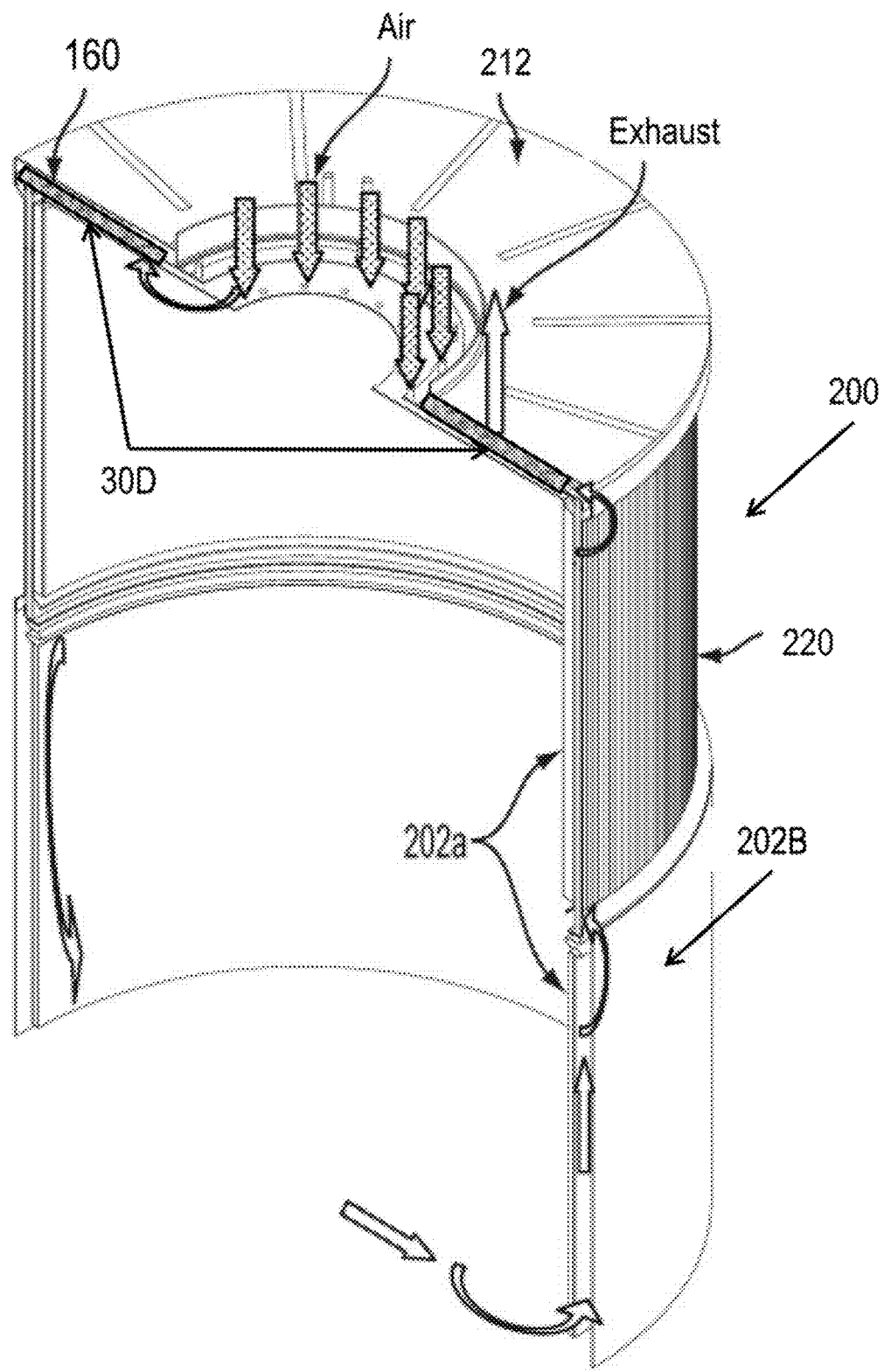
FIG. 4A shows a perspective view of an assembly comprising a steam generator and cathode recuperator of the module of FIG. 2, 4B is a side cross-sectional view of the assembly of FIG. 4A.
Figure 4B:
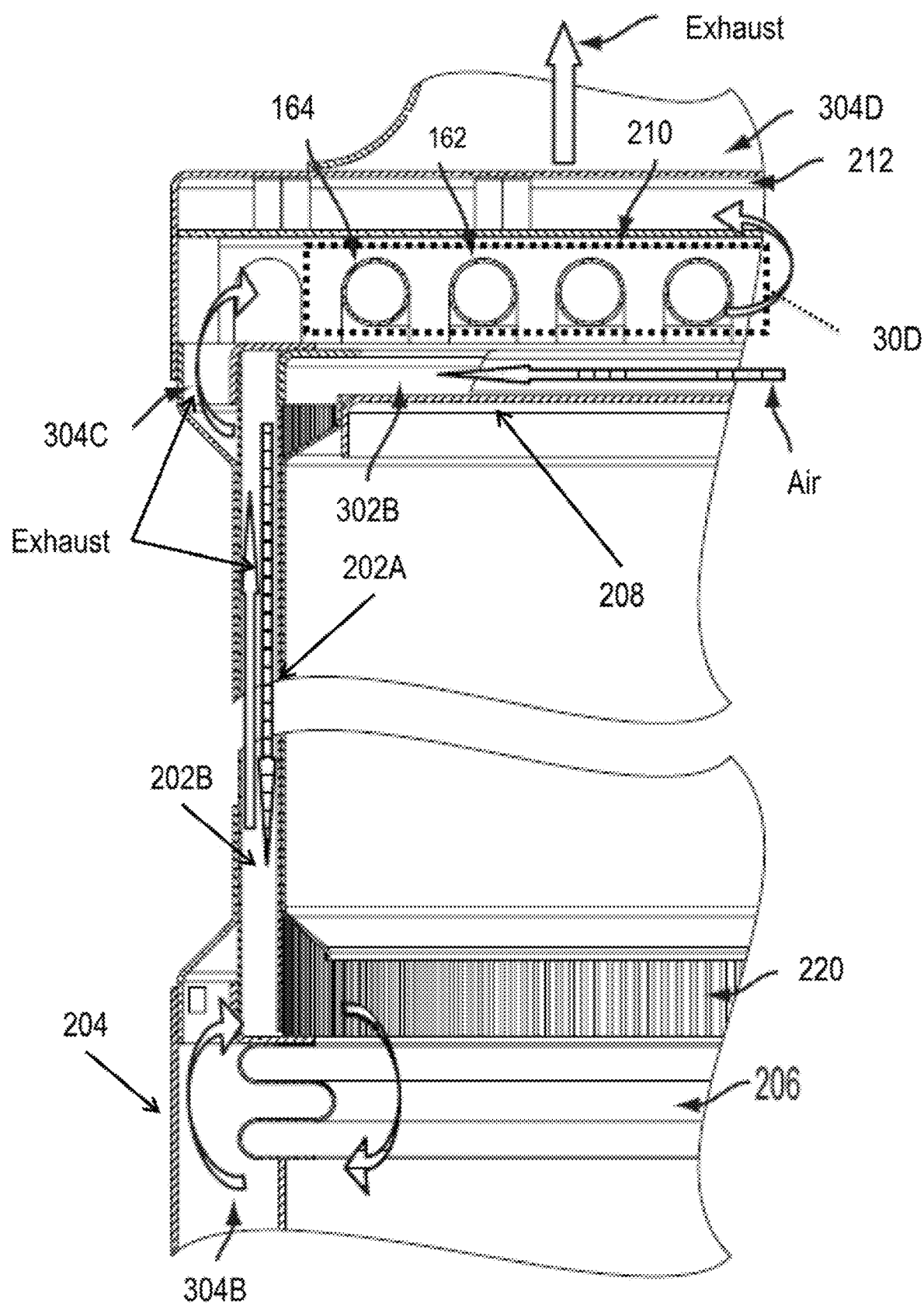
FIG. 4C is an exploded perspective view of the steam generator according to various embodiments of the present disclosure.
Figure 4C:
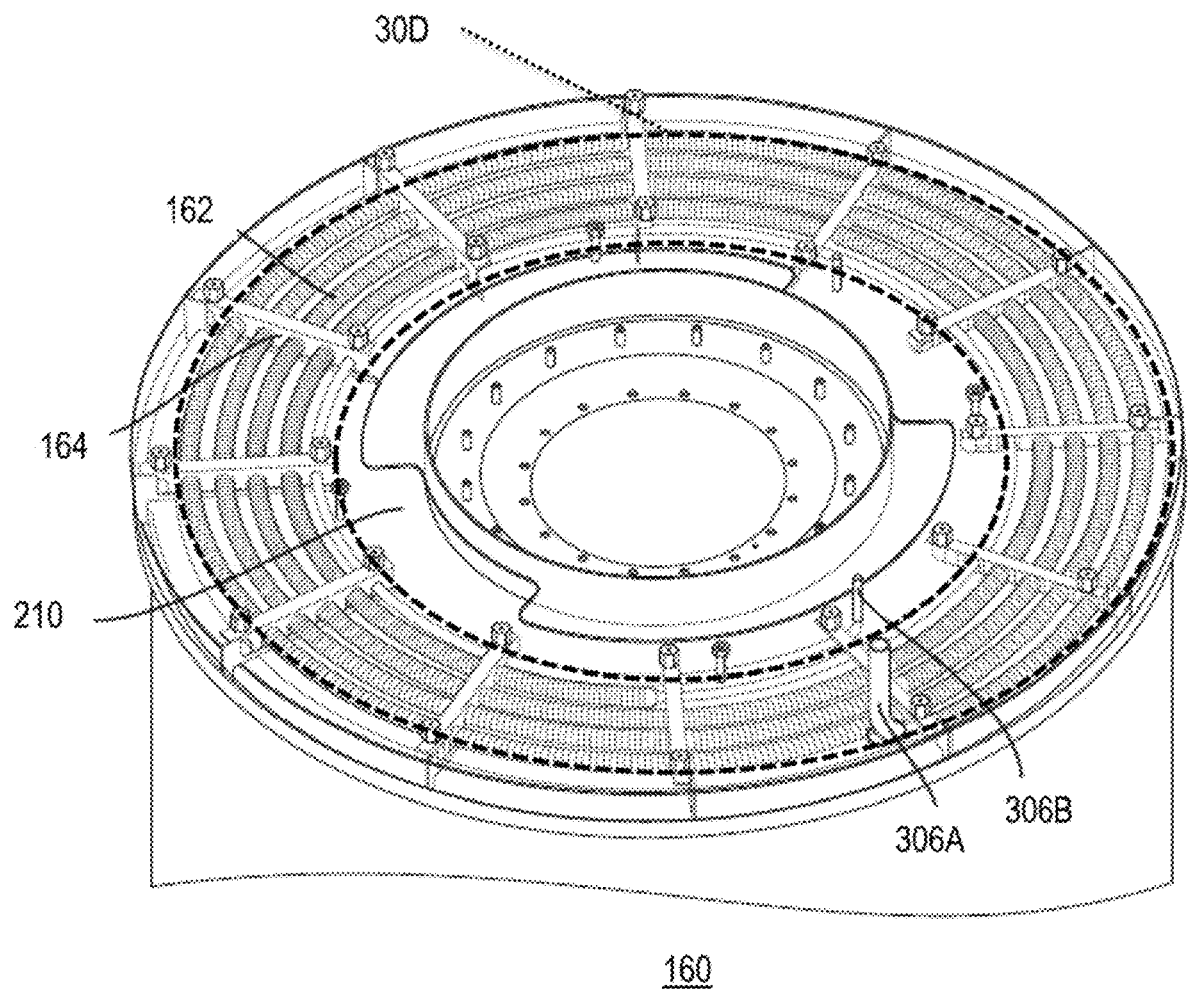

In other embodiments, a Cr filter 30D may be disposed in the steam generator 160. For example, FIG. 4B shows a side cross-sectional view of an assembly comprising the steam generator 160 and the cathode recuperator 200, according to various embodiments of the present disclosure, 4A is a perspective view of the assembly, and FIG. 4C is an exploded perspective view of the steam generator 160.

The Cr filter 30 may comprise any one or more of the above described Cr filters 30A, 30B, 30C and/or 30D located in the respective locations of the Cr filters 30A, 30B, 30C and/or 30D. The Cr filter 30 may be disposed at least partially inside of the hotbox 101 and at least partially outside of the hotbox 101, entirely inside of the hot box 101, or entirely outside of the hot box 101.

Referring to FIGS. 2 and 4A-4C, the cathode recuperator 200 may include a cylindrical corrugated fin plate or sheet 220 located between inner 202A and outer 202B heat shield insulation. The heat shield insulation 202A, 202B may be supported by a heat shield shell 204 located below the corrugated plate or sheet 220. The shell 204 may be connected to the heat shield insulation 202A, 202B by a bellows 206. The cathode recuperator 200 may include an inner lid 208, a baffle plate 210, and an outer lid 212.

The steam generator 160 and the Cr filter 30D may be disposed between the baffle plate 210 and the inner lid 208. The steam generator 160 may include a steam coil 162 and support ribs 164 configured to support the steam coil 162 below the baffle plate. The Cr filter 30D may be disposed above the steam coil 162, below the steam coil 162, or may surround the steam coil 162. The Cr filter 30D may have an annular shape, corresponding to the area in which the steam coil 162 is disposed.

The support ribs 164 hold the steam coil 162 in place under the baffle plate 210 (the baffle plate 210 and steam coil 162 are shown upside down in FIG. 4C, as compared to FIG. 4B, for clarity). The steam coil 162 may fluidly connect water conduits 306A and 306B. The steam coil 162 may be a partially or fully corrugated tube or a straight tube. The steam coil 162 may have any suitable shape, such as a spiral coil, or one or more coils with one or more U-turns.

Air conduit 302B may extend along the inner lid 208 and may be configured to provide relatively cool air to a first side of the corrugated sheet 220. Exhaust conduit 304B may be configured to provide relatively hot ATO exhaust (e.g., reaction exhaust) to a second side of the corrugated sheet 220. Accordingly, the corrugated sheet 220 may operate as a heat exchanger.

The exhaust may then be received by exhaust conduit 304C and then provided to the steam generator 160 between the baffle plate 210 and the inner lid 208. The exhaust generates steam by heating water in the steam coil 162. The exhaust may also pass through the filter 30D, such that the exhaust is purified during the heating of the steam generator 160. The exhaust may then flow into exhaust conduit 304D.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell system comprising:
fuel cells disposed in a stack and separated by interconnects;
a cathode recuperator configured to heat air provided to the stack using reaction exhaust provided from the stack;
a steam generator configured to receive the reaction exhaust from the cathode recuperator and generate steam using the reaction exhaust;
a hot box housing the stack, cathode recuperator, and steam generator; and
a Cr filter comprising a porous metal and configured to remove Cr vapor species from the reaction exhaust.

2. The system of claim 1, wherein the metal is a mesh or foam.

3. The system of claim 2, wherein the metal comprises aluminum or titanium.

4. The system of claim 1, wherein the metal is a pleated mesh or a multi-layer mesh.

5. The system of claim 1, wherein the Cr filter is disposed in an exhaust conduit fluidly connecting the cathode recuperator to the steam generator.

6. The system of claim 1, wherein the Cr filter is disposed in the steam generator.

7. The system of claim 6, wherein:
the steam generator comprises a steam coil; and
the Cr filter is disposed on or surrounds the steam coil.

8. The system of claim 1, wherein the Cr filter is disposed in an exhaust conduit configured to receive reaction exhaust output from the steam generator.

9. The system of claim 8, wherein the Cr filter is disposed at least partially inside of the hotbox.

10. The system of claim 8, wherein the Cr filter is disposed at least partially outside of the hotbox.

11. The system of claim 10, further comprising a cabinet housing the hot box, wherein the Cr filter is disposed in the cabinet entirely outside of the hot box.

12. The system of claim 11, further comprising a cabinet fan configured to provide cabinet air to the exhaust conduit, such that the cabinet air mixes with the reaction exhaust prior to reaching the Cr filter.

13. The system of claim 11, further comprising a cabinet fan configured to provide ambient air to the exhaust conduit, such that the ambient air mixes with the reaction exhaust prior to reaching the Cr filter.

14. The system of claim 1, wherein the interconnects comprise a Cr alloy that generate the Cr vapor species and the fuel cells comprise solid oxide fuel cells.

15. A method of operating a fuel cell system, comprising:
operating a fuel cell stack to generate a reaction exhaust containing Cr vapor species; and
providing the reaction exhaust through a Cr filter comprising a porous metal to remove at least 50% volume percent of the Cr vapor species from the reaction exhaust.

16. The method claim 15, wherein the metal is an aluminum or titanium mesh or foam.

17. The method of claim 15, further comprising:
a cathode recuperator in which air provided to the stack is heated using the reaction exhaust provided from the stack; and a steam generator in which the reaction exhaust received from the cathode recuperator vaporizes water into steam.

18. The method of claim 17, wherein the Cr filter is disposed in an exhaust conduit fluidly connecting a cathode recuperator to a steam generator.

19. The method of claim 17, wherein the Cr filter is disposed in the steam generator.

20. The method of claim 17, wherein the Cr filter is disposed in an exhaust conduit which receives the reaction exhaust output from the steam generator.

* * * * *